United States Patent [19]

Yaginuma

[11] Patent Number: 5,577,081
[45] Date of Patent: Nov. 19, 1996

[54] METHOD OF FORMING GRIDS FOR NUCLEAR FUEL ASSEMBLY AND GRIDS FORMED BY SAME METHOD

[75] Inventor: Yoshitaka Yaginuma, Naka-gun, Japan

[73] Assignee: Mitsubishi Nuclear Fuel Co., Tokyo, Japan

[21] Appl. No.: 473,207

[22] Filed: Jun. 7, 1995

[30] Foreign Application Priority Data

Jul. 21, 1994 [JP] Japan .................................. 6-169851

[51] Int. Cl.$^6$ .................................................. G21C 19/00
[52] U.S. Cl. ...................... 376/260; 376/451; 376/438; 376/462; 376/441
[58] Field of Search .................... 376/260, 451, 376/438, 462, 441; 976/DIG. 78, DIG. 81; 228/122.1, 124.1, 262.31

[56] References Cited

U.S. PATENT DOCUMENTS

| | | | |
|---|---|---|---|
| 3,577,920 | 5/1971 | London | 101/459 |
| 3,951,328 | 4/1976 | Wallace | 228/207 |
| 4,081,121 | 3/1978 | Picard | 228/181 |
| 4,111,348 | 9/1978 | Laird et al. | 228/181 |
| 4,590,347 | 5/1986 | Thatcher et al. | 219/10.49 R |
| 4,650,108 | 3/1987 | Gallagher | 228/124 |
| 4,662,288 | 5/1987 | Hastings et al. | 109/2 |
| 5,116,646 | 5/1992 | Taniguchi et al. | 427/383.5 |
| 5,188,797 | 2/1993 | Bryan | 376/438 |

FOREIGN PATENT DOCUMENTS

| | | |
|---|---|---|
| 2094621 | 10/1994 | Canada . |
| 2364729 | 4/1978 | France . |
| 56-7787 | 2/1981 | Japan . |
| 59-44948 | 11/1984 | Japan . |
| 60-352 | 1/1985 | Japan . |
| 62-144872 | 6/1987 | Japan . |

*Primary Examiner*—Charles T. Jordan
*Assistant Examiner*—Meena Chelliah
*Attorney, Agent, or Firm*—Oblon, Spivak, McClelland, Maier, & Neustadt, P.C.

[57] ABSTRACT

A method of forming a nuclear fuel assembly grid, as well as the resulting grid itself, are disclosed. In the formation of the grid, formed straps having slits are prepared, arranged into a grid form by intersecting the straps with each other through the slits, and the intersections of the associated straps are brazed. Prior to the step of arranging the straps, those portions to be brazed are subjected to a pretreatment, in which an paste, prepared of a mixture of a filler metal and a vehicle, is applied to the portions to be brazed to form a thin film thereon.

8 Claims, 6 Drawing Sheets

METHOD OF FORMING GRIDS FOR NUCLEAR FUEL ASSEMBLY AND GRIDS FORMED BY SAME METHOD

BACKGROUND OF THE INVENTION

1. Technical Field of the Invention

The present invention relates to a method of forming grids for nuclear fuel assemblies, as well as to the grids formed by the application of the same method.

2. Background Art

In the conventional method of manufacturing nuclear fuel assembly grids, straps 1, which are formed, for example, of nickel alloy so as to have slits therein, are, as shown in FIGS. 7A to 7C, assembled into a grid form, and the intersections 2 of the straps 1 are then brazed. In this method, nickel is usually plated on the surfaces of the straps 1 in advance in order to ensure high-quality brazing.

More specifically, FIG. 7A depicts a part of the assembled straps 1, showing a brazing filler metal (hereinafter referred to as "filler metal") being adherently placed on top of the intersections 2 of the straps 1. When the straps 1 are heated in a vacuum type brazing furnace (hereinafter referred to as "vacuum furnace"), the filler metal melts and flows down along the intersections 2, so that the intersections 2 are presumed to be brazed uniformly over their entire lengths. FIG. 7B depicts the result of brazing in the case where the brazing is effected on the straps having nickel-plated surfaces, whereas FIGS. 7C and 7D depict the result of brazing in the cases where the brazing is carried out on the non-Ni plated straps. In either of the straps shown in FIGS. 7C and 7D, good brazing results have not been obtained due to insufficient or ununiform flow of the filler metal flowing down from the top of the intersections 2 therealong. In FIG. 7C, unbrazed portions are shown remaining, whereas in FIG. 7D, the width and thickness of the brazed parts have become excessive.

Thus, it has hitherto been conventional to carry out nickel plating on the straps 1 in order to ensure excellent brazing quality. However, such a plating process is unavoidably associated with an increased cost and environmental pollution. Therefore, there has been the need for the development of a novel brazing technique which requires no plating treatment but achieves excellent brazing quality.

SUMMARY OF THE INVENTION

It is therefore the primary object of the present invention to provide a method of forming a nuclear fuel assembly grid which requires no plating treatment but ensures improved brazing quality.

Another object of the invention is to provide a nuclear fuel assembly grid which is obtained by the aforesaid method.

According to a first aspect of the invention, there is provided a method of forming a nuclear fuel assembly grid, which includes the steps of (a) preparing a plurality of formed alloy straps each having slits, (b) arranging the straps into a grid form by intersecting the straps with each other through the slits, and (c) brazing intersections of the associated straps, the method further comprising the step of:

(d) subjecting those portions to be brazed to a pretreatment prior to the arranging step (b), the pretreatment including applying a paste, comprising a mixture of a filler metal and a vehicle, to the portions to be brazed to form a thin film thereon.

In the foregoing, the pretreatment step (d) may further include drying the paste film, heating the straps in a vacuum furnace to melt the filler metal in the paste, and cooling the straps; and the brazing step (c) may include placing a filler metal daub on top of the intersections of the straps, and heating the straps in a vacuum furnace to effect the brazing of the straps. Alternatively, the method may further comprise the steps of drying the paste film, heating the straps in a vacuum furnace to melt the filler metal in the paste, and cooling the straps between the arranging step (b) and the brazing step (c); and the brazing step (c) may include placing a filler metal daub on top of the intersections of the straps, and heating the straps in a vacuum furnace to effect the brazing of the straps.

Furthermore, the brazing step (c) may include placing a filler metal daub on top of the intersections of the straps, and heating the straps in a vacuum furnace to effect the brazing of the straps; and the method may further comprise the steps of drying the paste film after the pretreatment step (d), subsequently effecting the brazing step (c), and heating the straps in a vacuum furnace to effect the brazing of the straps. In this modification, the step of drying the paste film may be omitted.

Moreover, the filler metal may contain Ni powder, whereas the vehicle may contain a synthetic resin and an organic solvent. In addition, the paste may further contain an additional substance selected from the group consisting of water, an organic solvent such as methyl alcohol and a liquid surface active agent such as polyethylene glycol fatty acid ester.

According to another aspect of the invention, there is provided a nuclear fuel assembly grid formed using the aforesaid method.

In the method of the present invention, since the pretreatment is carried out on the surfaces of the straps, excellent solderability can be ensured even though the plating is omitted. Therefore, the nuclear fuel assembly grids of excellent quality can be obtained at reduced cost without causing any environmental problems.

DETAILED DESCRIPTION OF THE EMBODIMENTS

The present invention will be described in detail with reference to the accompanying drawings.

Figure 1A:
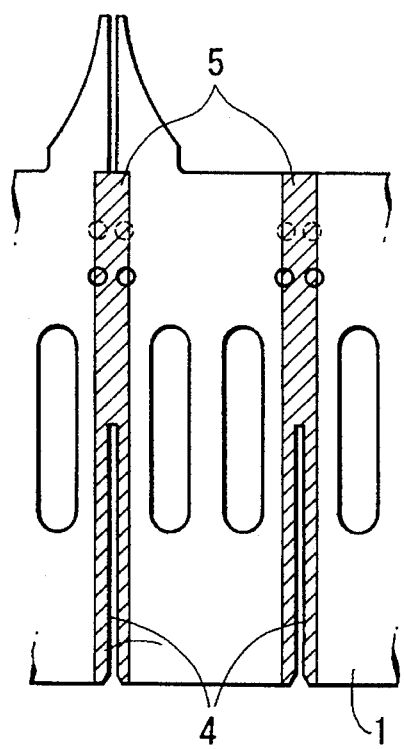
FIGS. 1A and 1B are views showing formed straps to be used for the formation of a grid in accordance with the present invention.
Figure 1B:
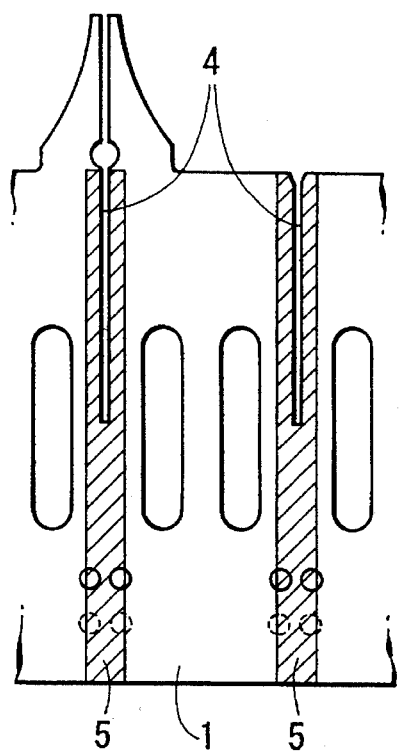
Figure 2:
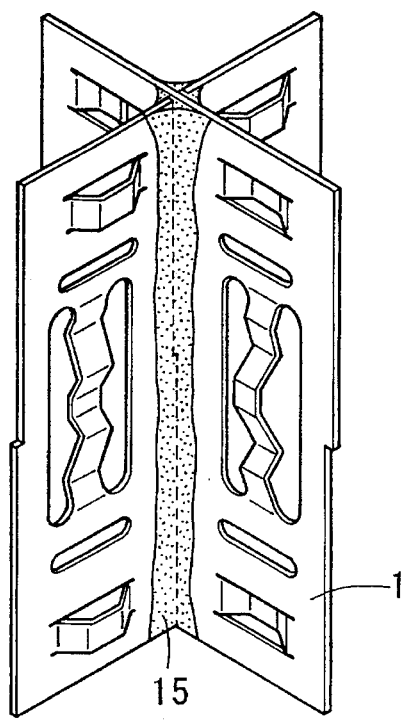
FIG. 2 is a perspective view showing the straps assembled and brazed to each other.

For the manufacture of a nuclear fuel assembly grid in accordance with the method of the present invention, formed straps 1 having slits 4, as depicted in FIGS. 1A and 1B, are employed, as is the case with the conventional method. As depicted in FIG. 2, these straps 1 are assembled into a grid form by inserting one strap into the slit of the associated strap, and the intersections 2, at which the assembled straps perpendicularly intersect each other, are subjected to brazing, as indicated by reference numeral 15 in FIG. 2.

Hereinbelow, a first embodiment of the grid-forming method of the present invention will be explained with reference to a flow chart shown in FIG. 3. First, the surfaces of the formed strap 1 are cleaned by means of an ultrasonic cleaner (or an etching device, when appropriate) to remove the adhering oils or the like, and the straps 1 thus cleaned are placed on a screen printing machine (Step 1, abbreviated to S1 in the drawings and the same shall apply hereinafter). In parallel with the above operation, a vehicle is added to a filler metal powder (e.g. above 50% nickel content), and surface active agents, alcohols or the like are further added thereto and mixed to obtain a paste having adjusted viscosity and solid content (Step 2). Subsequently, as shown in FIGS. 1A and 1B, the paste is thinly applied to the elongated portions along the slit 4 as well as the portions extending therefrom in a direction in which the slit 4 extends (Step 3). Such an application of the paste is carried out using a known screen printing technique. When the paste is dried (Step 4), the straps 1 are accommodated in a vacuum furnace and heated therein, so that a preliminary brazing is effected with the filler metal component in the paste (Step 5). The resulting straps 1 are then cooled in the furnace (Step 6), and after having been taken out from the furnace, the conditions of the preliminary brazing are checked (Step 7). Thereafter, the straps 1 are assembled into a grid form to provide a temporarily assembled grid (Step 8).

Subsequently, the filler metal daub is adherently placed on the top of the intersections 2 of the temporarily assembled straps 1. The temporarily assembled straps are then introduced into the vacuum furnace and heated therein. Thus, the filler metal is melted to spread on the preliminarily brazed portions due to the surface affinity, resulting in a uniform brazing of the strap intersections 2 (Step 10). In the foregoing process, a nickel foil may be cut into strips and disposed adjacent to the straps 1 so as to serve as an oxygen adsorbing getter. Thus, the formation of the grid is completed (Step 11).

Figure 4:
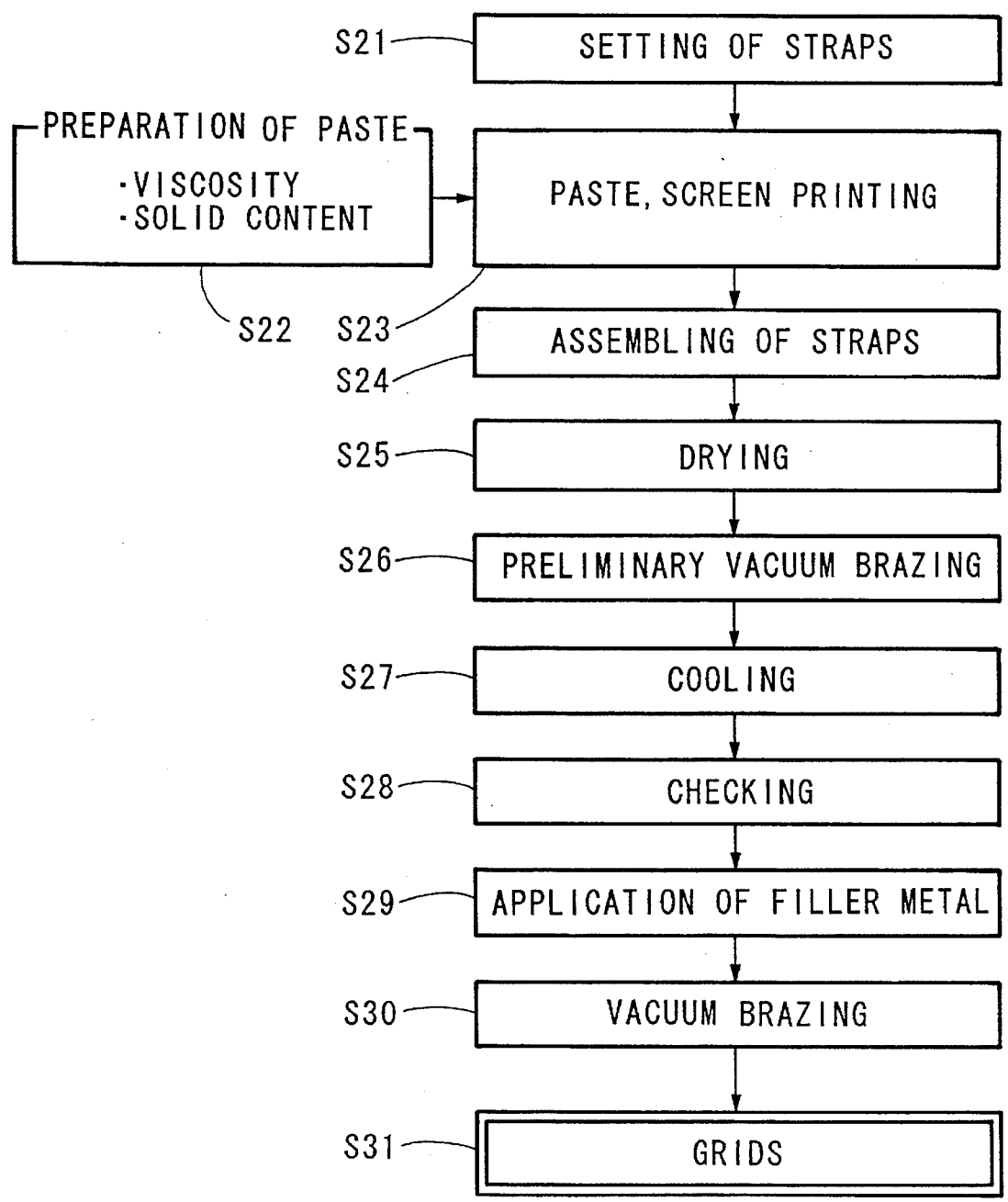
FIG. 4 is a flow chart similar to FIG. 3, but showing that for a modified method of the invention.

FIG. 4 shows a flow chart of the steps of the method of forming the grid in accordance with a modified embodiment of the invention.

Figure 3:
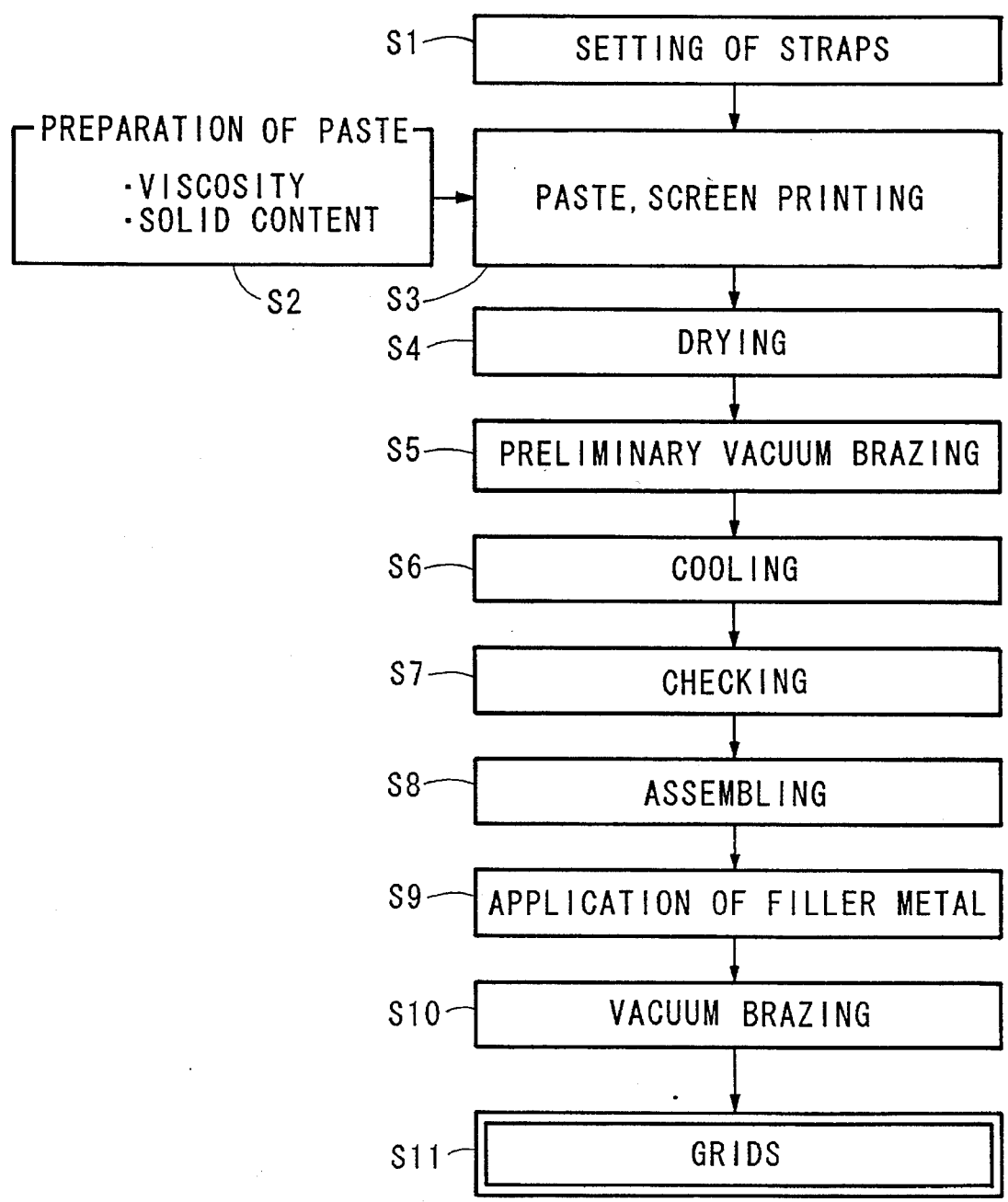
FIG. 3 is a flow chart showing the steps for the method of formation of a nuclear fuel assembly in accordance with a first embodiment of the invention.

In a manner similar to that of the method illustrated in FIG. 3, the surfaces of the straps 1 are cleaned by means of an ultrasonic cleaner (or an etching device, when appropriate) to remove the adhering oils or the like, and the straps 1 thus cleaned are placed on a screen printing machine (Step 21). In parallel with the above operation, a vehicle is added to a filler metal powder (e.g. above 50% nickel content), and surface active agents, alcohols or the like are further added thereto and mixed to obtain a paste having adjusted viscosity and solid content (Step 22). Subsequently, as shown in FIGS. 1A and 1B, the paste is thinly applied to the elongated portions along the slit 4 as well as the portions extending therefrom in a direction in which the slit 4 extends (Step 23).

Then, before the paste is dried, the straps 1 are assembled into a grid form (Step 24). When the paste is dried (Step 25), the straps 1 are accommodated in a vacuum furnace and heated therein, so that a preliminary brazing is effected with the filler metal component in the paste (Step 26). The resulting straps are then cooled in the furnace (Step 27), and after having been taken out from the furnace, the conditions of the preliminary brazing are checked (Step 28).

Thereafter, the filler metal daub is adherently placed on the top of the intersections 2 of the straps 1 thus temporarily assembled (Step 29). Then, the temporarily assembled straps 1 are introduced into a vacuum furnace and heated therein. The filler metal is thus melted to spread on the preliminarily brazed portions due to the surface affinity, resulting in a uniform brazing of the strap intersections 2 (Step 30). Thus, the formation of the grid is completed (Step 31).

Figure 5:
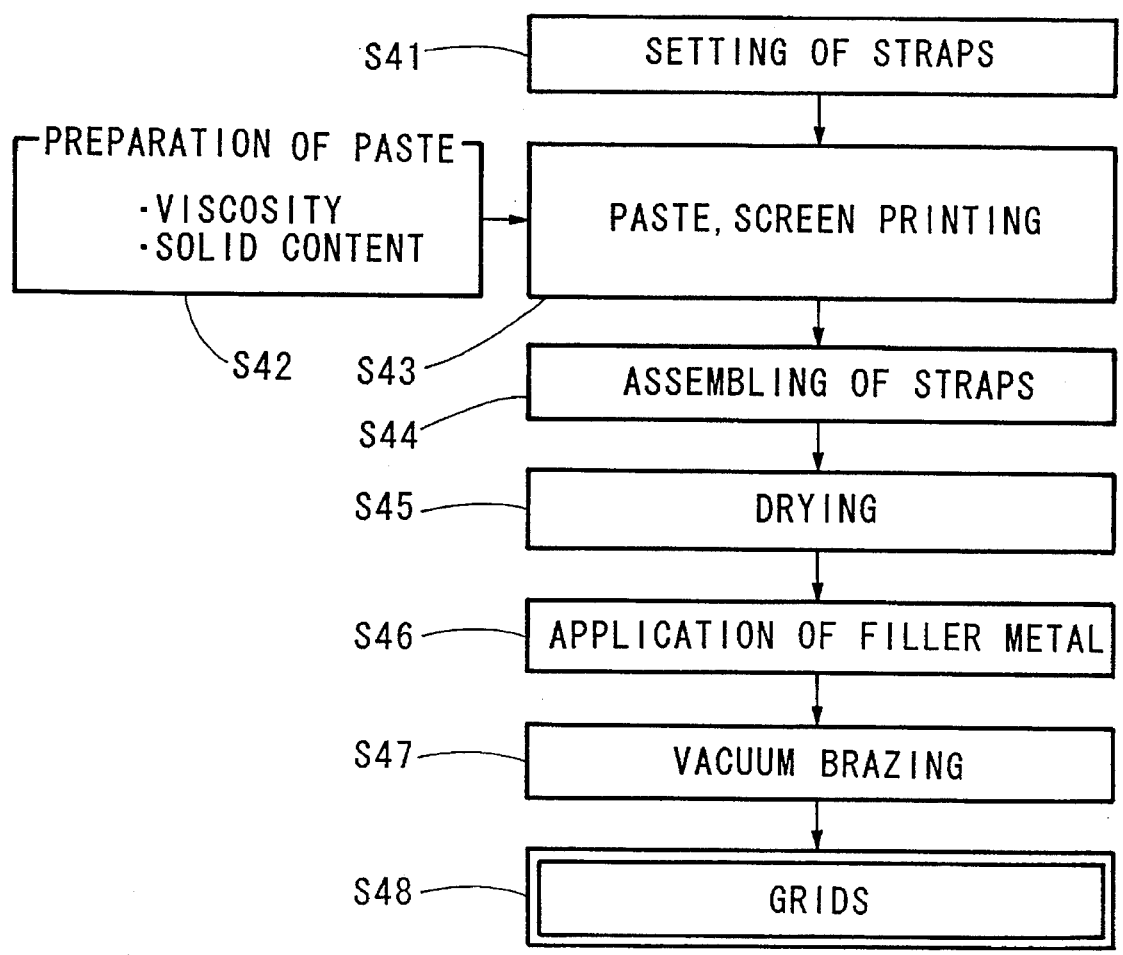
FIG. 5 is a flow chart similar to FIG. 3, but showing that for another modified method of the invention.

FIG. 5 shows a flow chart of the steps of the method of forming the grid in accordance with another modified embodiment of the invention.

In a manner similar to that of the method illustrated in FIG. 4, the surfaces of the straps 1 are cleaned by means of an ultrasonic cleaner (or an etching device, when appropriate) to remove the adhering oils or the like, and the straps 1 thus cleaned are placed on a screen printing machine (Step 41). In parallel with the above operation, a vehicle is added to a filler metal powder (e.g. above 50% nickel content), and surface active agents, alcohols or the like are further added thereto and mixed to obtain a paste having adjusted viscosity and solid content (Step 42). Subsequently, as shown in FIGS. 1A and 1B, the paste is thinly applied to the elongated portions along the slit 4 as well as the portions extending therefrom in a direction in which the slit 4 extends (Step 43).

Then, before the paste is dried, the straps 1 are assembled into a grid form (Step 44). When the paste is dried (Step 45), the filler metal daub is adherently placed on the top of the intersections 2 of the straps 1 (Step 46). Thereafter, the straps 1 thus temporarily assembled are accommodated in a vacuum furnace and heated therein. Thus, the filler metal component in the paste as well as the filler metal adhered to the top of the intersections 2 of the straps 1 are melted to spread on the preliminarily brazed portions due to the surface affinity, resulting in a uniform brazing of the strap intersections 2 (Step 47). The formation of the grid is thus completed (Step 48).

Figure 6:
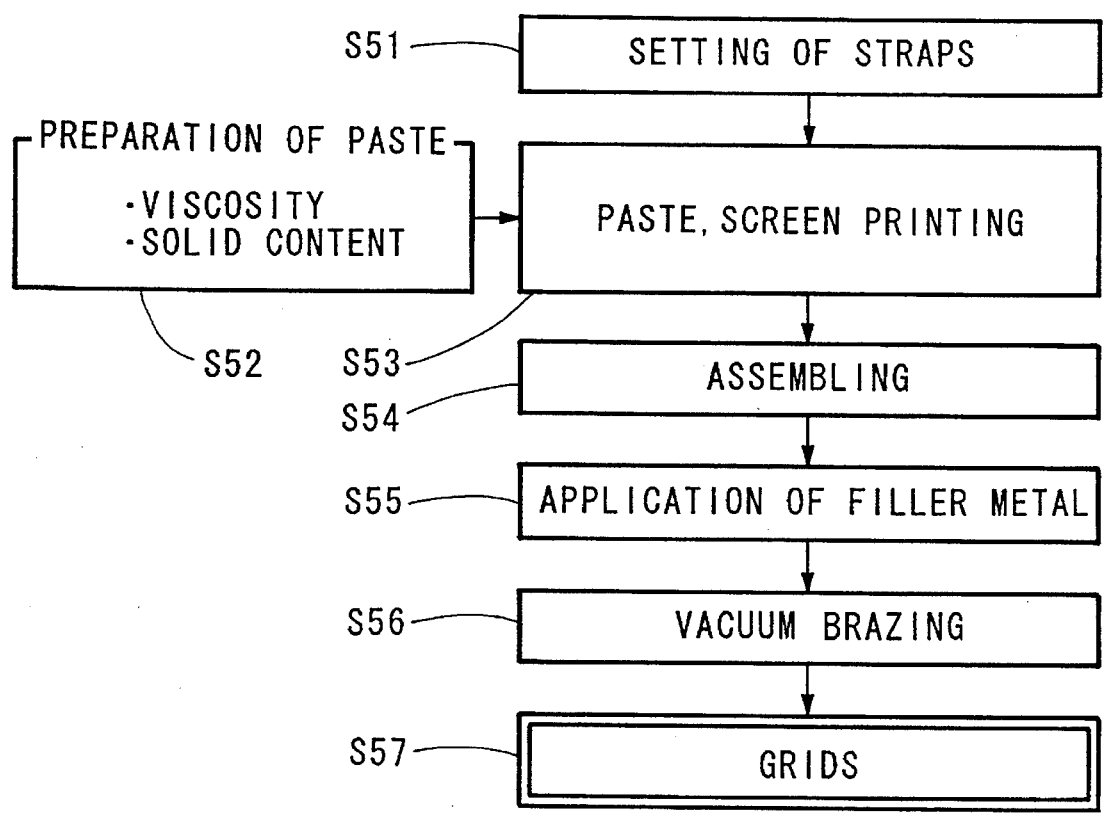
FIG. 6 is a flow chart similar to FIG. 3, but showing that for a further modified method of the invention.
Figure 7A:
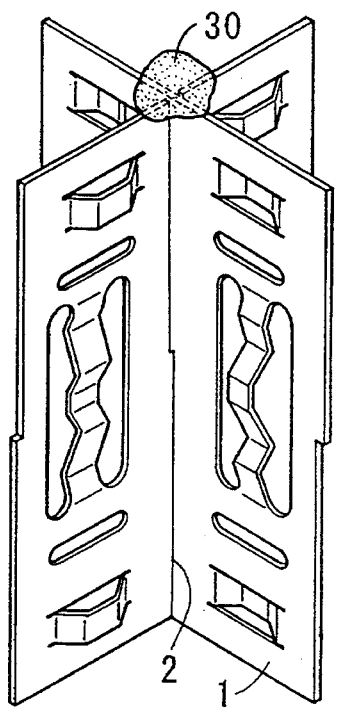
FIGS. 7A to 7D are views similar to FIG. 2, but showing the grids formed using the prior art method.
Figure 7B:
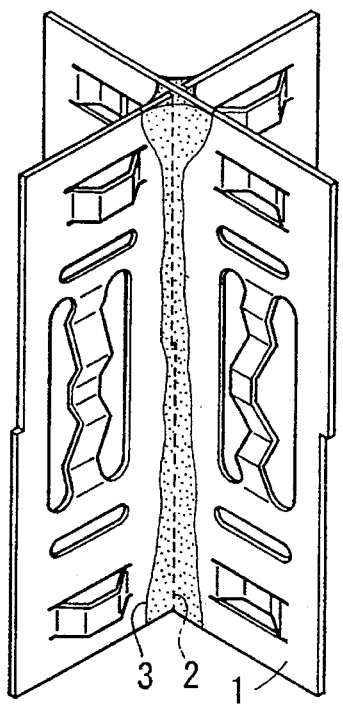
Figure 7C:
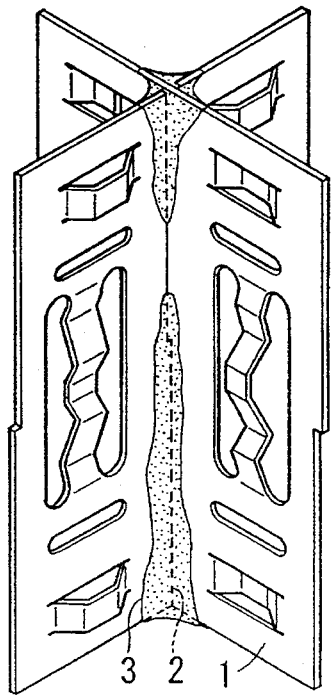
Figure 7D:
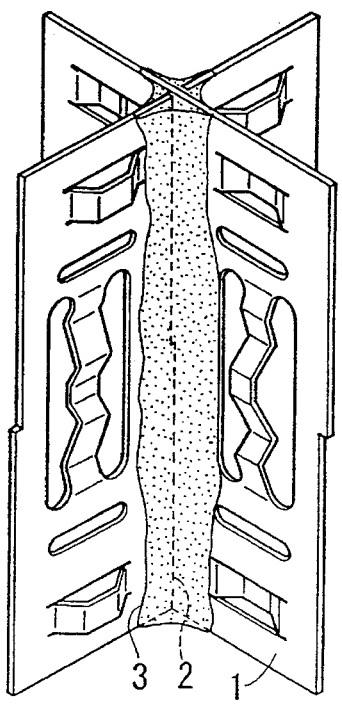

FIG. 6 shows a flow chart of the steps of the method of forming the grid in accordance with a further modified embodiment of the invention.

In a manner similar to that of the method illustrated in FIG. 4, the surfaces of the straps 1 are cleaned by means of an ultrasonic cleaner (or an etching device, when appropriate) to remove the adhering oils or the like, and the straps 1 are placed on a screen printing machine (Step 51). In parallel with the above operation, a vehicle is added to a filler metal powder (e.g. above 50% nickel content), and surface active agents, alcohols or the like are added thereto and mixed to obtain a paste having adjusted viscosity and solid content (Step 52). Subsequently, as shown in FIG. 1, the paste is thinly applied to the elongated portions along the slit 4 as well as the portions extending therefrom in a direction in which the slit 4 extends (Step 53).

Then, before the paste is dried, the straps 1 are assembled into a grid form (Step 54). Thereafter, the filler metal daub is adherently placed on the top of the intersections 2 of the straps 1 thus temporarily assembled (Step 55). Subsequently, the temporarily assembled straps 1 are accommodated in a vacuum furnace and heated therein. Thus, the filler metal adhering to the top of the intersections 2 of the straps 1 as well as the filler metal component in the paste are melted to spread on the preliminarily brazed portions due to the surface affinity, resulting in a uniform brazing of the strap intersections 2 (Step 56), and the formation of the grid is thus completed (Step 57).

In the methods as described above, the paste containing a filler metal therein is applied to the straps, and the filler metal is further placed on the paste to carry out the brazing, the filler metal is made to flow on the paste uniformly and smoothly without forming any voids. Accordingly, the prior art problems such as high cost, pollution or the like can be avoided, and the nuclear fuel assembly grids having excellent brazing qualities can be obtained.

Finally, the present application claims the priority of Japanese Patent Application No. 6-169851, filed Jul. 21, 1994, which is incorporated herein by reference.

What is claimed is:

1. A method of forming a nuclear fuel assembly grid, which includes the steps of (a) preparing a plurality of formed alloy straps each having slits, (b) arranging the straps into a grid form by intersecting the straps with each other through the slits, and (c) brazing intersections of the associated straps, wherein said method further comprises the step of:

(d) subjecting those portions to be brazed to a pretreatment prior to said arranging step (b), said pretreatment including applying a paste comprising a mixture of a filler metal and a vehicle, to the portions to be brazed to form a thin film thereon.

2. The method according to claim 1, wherein said pretreatment step (d) further includes drying the paste film, heating the straps in a vacuum furnace to melt the filler metal in the paste, and cooling the straps; and wherein said brazing step (c) includes placing a filler metal daub on top of the intersections of the straps, and heating the straps in a vacuum furnace to effect the brazing of the straps.

3. The method according to claim 1, further comprising the steps of drying the paste film, heating the straps in a vacuum furnace to melt the filler metal in the paste, and cooling the straps between said arranging step (b) and said brazing step (c); wherein said brazing step (c) includes placing a filler metal daub on top of the intersections of the straps, and heating the straps in a vacuum furnace to effect the brazing of the straps.

4. The method according to claim 1, wherein said brazing step (c) includes placing a filler metal daub on top of the intersections of the straps, and heating the straps in a vacuum furnace to effect the brazing of the straps; said method further comprising the steps of drying the paste film after said pretreatment step (d), subsequently effecting said brazing step (c), and heating the straps in a vacuum furnace to effect the brazing of the straps.

5. The method according to claim 1, wherein said brazing step (c) includes placing a filler metal daub on top of the intersections of the straps immediately after said arranging step (b), and heating the straps in a vacuum furnace to effect the brazing of the straps.

6. The method according to claim 1, wherein said paste further contains an additional substance selected from the group consisting of water, organic solvent, and liquid surface active agent.

7. The method according to claim 1, wherein said pretreatment step (d) comprises employing screen printing.

8. A grid for a nuclear fuel assembly, formed by the application of the method according to any one of claims 1 to 7.

* * * * *